Nov. 25, 1952 — A. H. HABERSTUMP — 2,619,250
CRATE
Filed Sept. 19, 1949 — 5 Sheets-Sheet 2
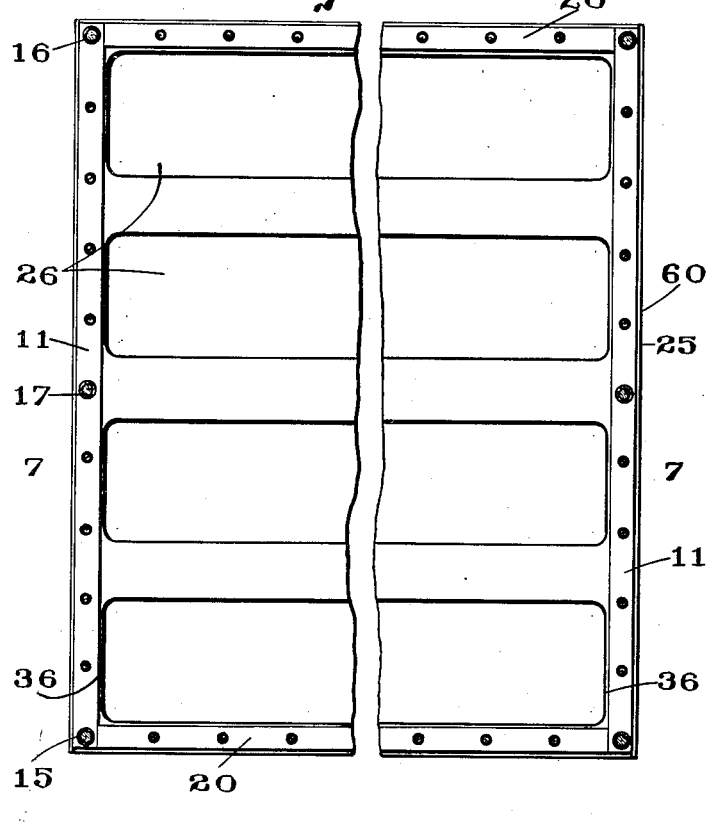
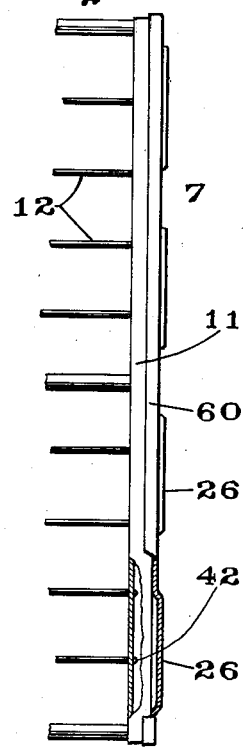
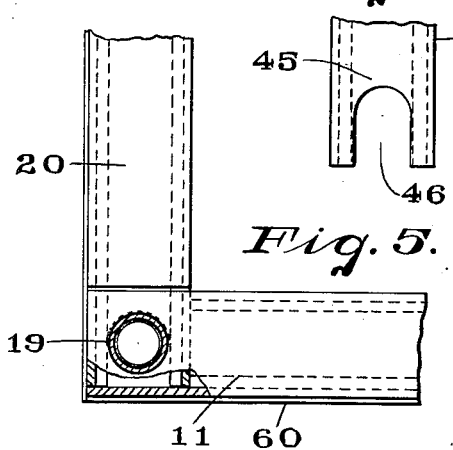
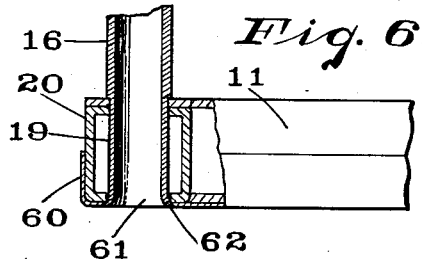
INVENTOR.
ALFRED H. HABERSTUMP
BY Clifford C. Bradley
ATTORNEY Nov. 25, 1952 A. H. HABERSTUMP 2,619,250
CRATE
Filed Sept. 19, 1949 5 Sheets-Sheet 3
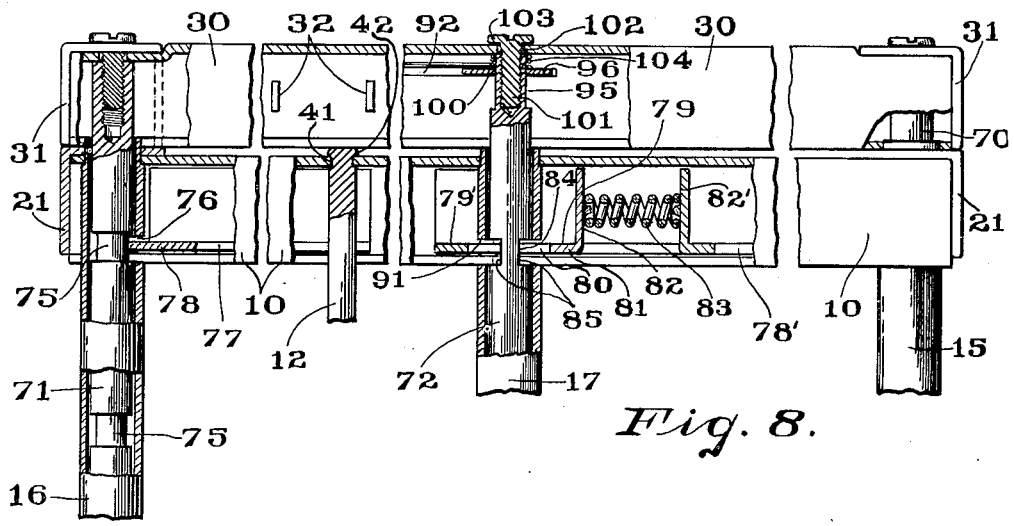
Fig. 8.
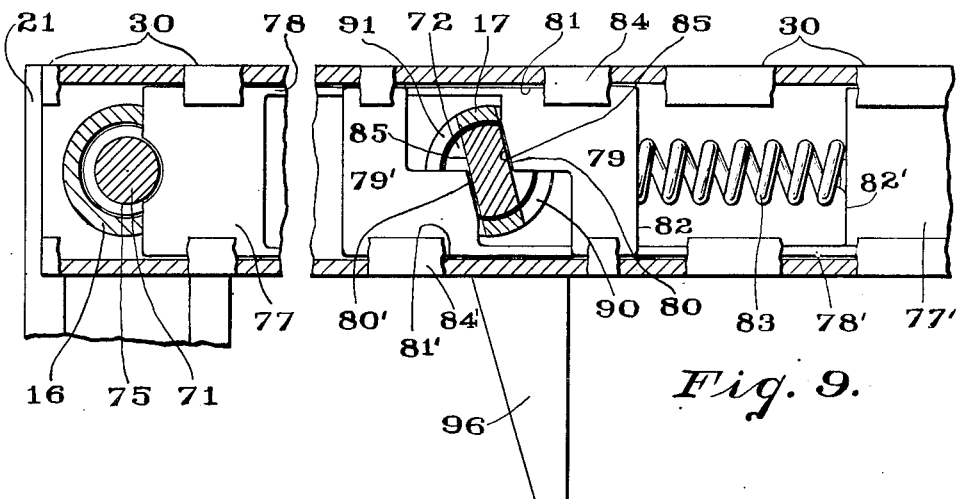
Fig. 9.
Fig. 10.
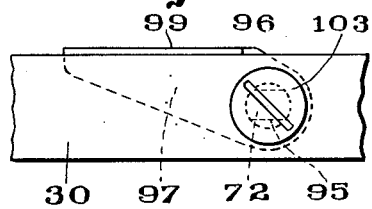
INVENTOR.
ALFRED H. HABERSTUMP.
BY Clifford C. Bradbury
ATTORNEY

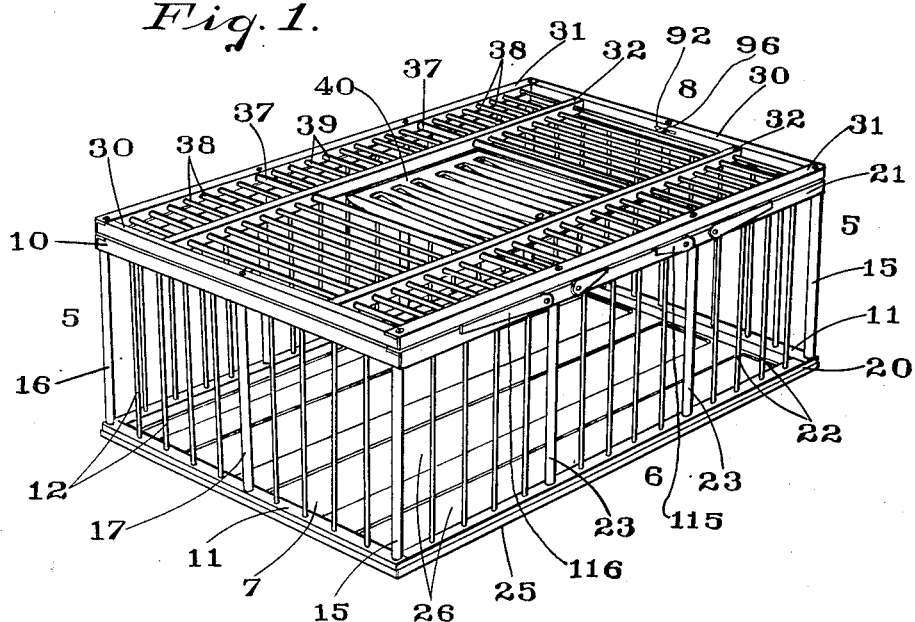
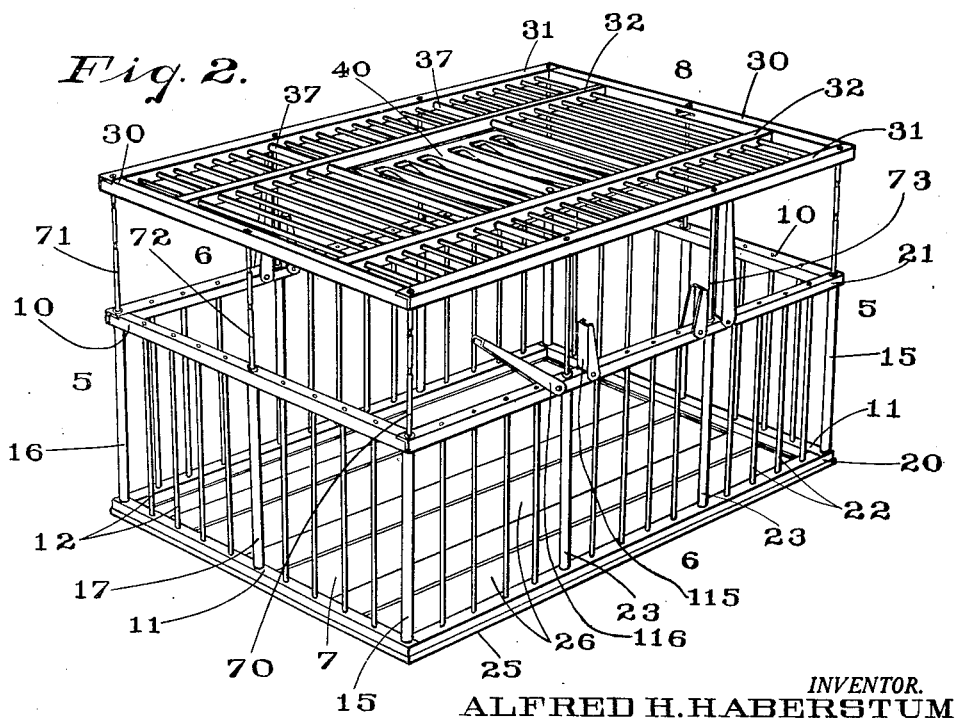

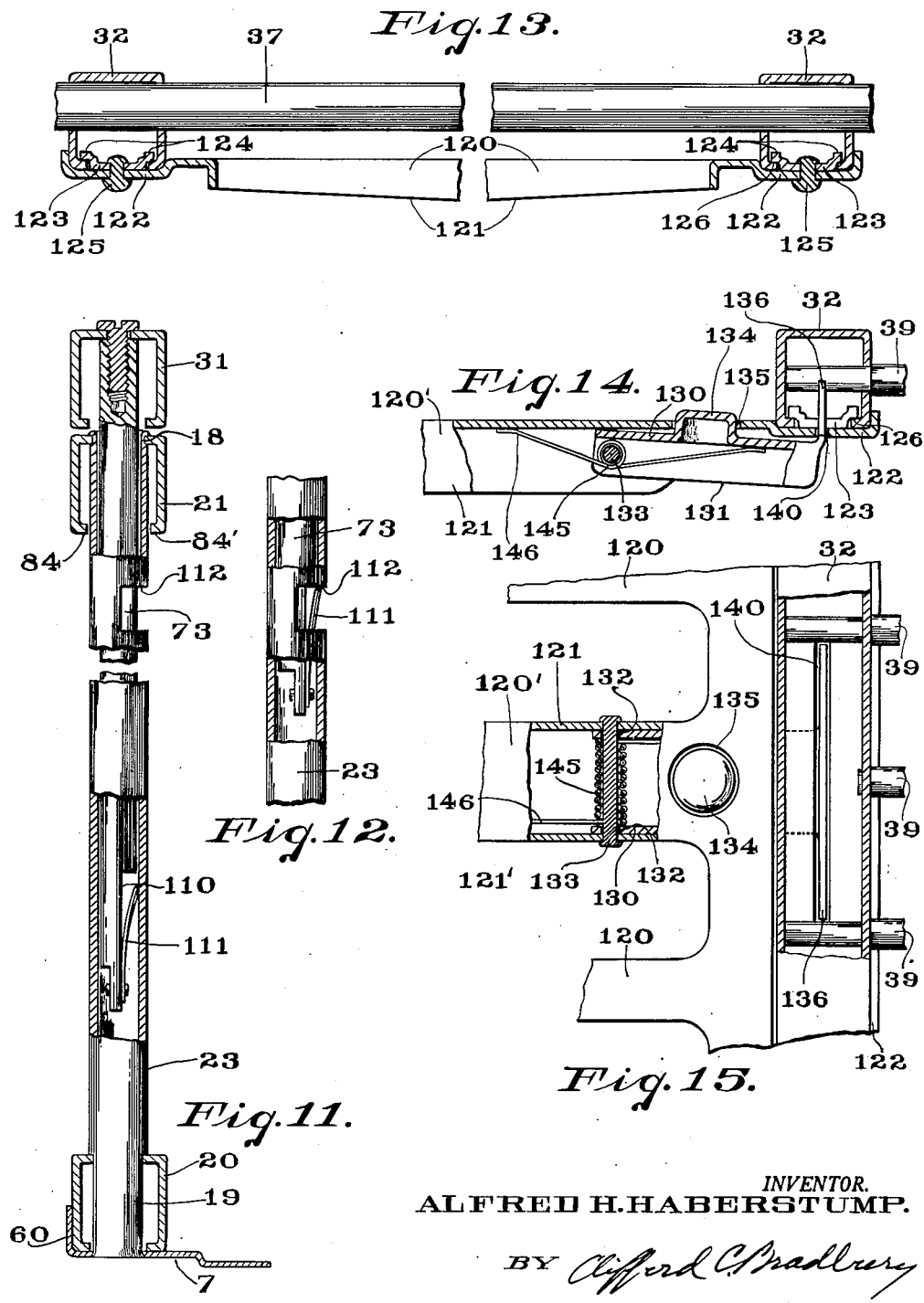

Patented Nov. 25, 1952

2,619,250

UNITED STATES PATENT OFFICE 2,619,250

CRATE

Alfred H. Haberstump, Detroit, Mich., assignor, by mesne assignments, to Emmett H. Whittington Application September 19, 1949, Serial No. 116,584

9 Claims. (Cl. 220—8)

My invention relates to crates for handling live fowl, and particularly to a lightweight metal crate such as disclosed in the pending application of Emmett H. Whittington, Serial No. 16,369, filed March 22, 1948.

The objects of my invention in general are to improve the structure of the device of the above noted application to facilitate the manufacture, handling and assembly, to strengthen certain parts without adding weight, and to improve operating features involved in the adjustments of the crate for different purposes.

In accordance with one of the objects of the invention, I make use of a special form of channel which adds stiffness and strength to the panel structures without adding weight to the product.

According to another object, I provide a novel form of bottom structure which permits the nesting of the crates when stacked one upon the other, thereby preventing end or side slippage between the crates while being carried in stacked relation upon a truck.

Another object of the invention has to do with structural features which permit the end and side panels to be quickly and easily assembled together to form a completed crate.

Other objects of the invention relate to locking and latching means for facilitating the ready adjustment of the crate into any one of its usable positions, and for actuating the parts against accidental movement out of any one of its positions of adjustment.

Other characteristics of the invention relate to the structural features and method of assembly which result in a highly resilient sturdy structure capable of withstanding, without permanent distortion or injury, any forces to which it may be subjected in any ordinarily expected use of the crate.

My invention is illustrated in the accompanying drawing, in which

Fig. 1 is a perspective in full lines of the crate in a collapsed position.

Fig. 2 is a perspective in full lines of the crate in completely expanded position.

Fig. 3 is a fragmentary top view of the bottom or floor of the crate.

Fig. 4 is a fragmentary sectional view looking at one end of the bottom of the crate.

Fig. 5 is a fragmentary plan view of a bottom corner assembly.

Fig. 6 is a fragmentary elevational view with parts in section of a bottom corner assembly.

Fig. 7 is a fragmentary detail view of the end of a bottom side channel.

Fig. 8 is a fragmentary vertical sectional view, with parts broken away, through one end of the crate to illustrate the end locking mechanism.

Fig. 9 is a fragmentary horizontal sectional view through an upper channel illustrating details of the end locking mechanism.

Fig. 10 is a fragmentary plan view of a part of the upper end channel showing the location of the lever for operating the end lock mechanism.

Fig. 11 is an elevational view with parts in section of a side latching mechanism in unopened position.

Fig. 12 is a fragmentary view with parts in section of the side latch in operated position.

Fig. 13 is a view in side elevation with parts in section of a door assembly for the crate.

Fig. 14 is a fragmentary detail sectional view of a latch mechanism for the door.

Fig. 15 is a detail plan view with parts in section of the door lock assembly.

The structure embodying the features of this invention comprises generally end panels 5, side panels 6, a bottom 7 and a top 8 which is adjustable with respect to the body portion of the crate.

Figure 16:
Fig. 16 is an enlarged detail view showing the formation of an aluminum rod used in the panel assemblies of ends and sides of the crate.
Figure 17:
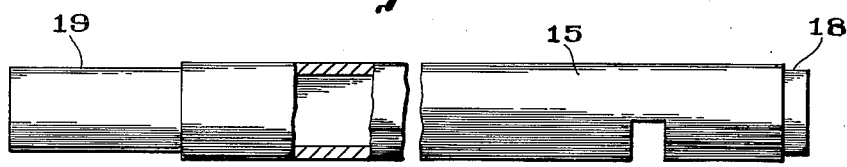
Fig. 17 is an enlarged detail view illustrating the general form of the tubular members used in the assemblies of the end and side panels of the crate.
Figure 18:
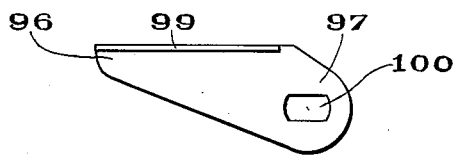
Fig. 18 is a bottom plan view of a lock operating lever.

Each end panel 5 comprises upper and lower channel members 10 and 11 of C-shaped cross-section secured in parallel relation to each other by means of spaced apart aluminum rods 12, each of which is provided at each end with a shoulder 13 and a slightly tapered and reduced portion 14, as shown in Fig. 16. Holes, which are slightly smaller in diameter than the largest diameter of the reduced portions 14, are provided in the plate portions of the upper and lower channel members 10 and 11 to receive the tapered reduced portions 14, which are upset or riveted to draw the shoulders 13 against the plates of the channel members 10 and 11. The upsetting or riveting of the rods 12 is against the outer face of the plate of the upper channel member 10 and against the inner face of the plate of the lower channel members 11.

Each end panel includes in its assembly three tubular members, 15 and 16 located at its end, and 17 located in the center of the panel. Each of the tubular members is provided at its ends with reduced portions 18 and 19, the reduced portion 19 at the lower end being longer than the reduced portion 18 at the upper end.

Each side panel comprises lower and upper channels 20 and 21 of C-shaped cross section, tied together by means of aluminum rods 22, the same as the rods 12 of the end panels, and secured in the same manner to the channels 20 and 21. Each side panel includes a pair of tubular members 23 equally spaced from the ends of the panels and from each other. These tubular members are formed on their ends in the same manner as the tubular members 15, 16 and 17 in the end panels.

A bottom closure for the crate comprises a sheet 25 of aluminum formed with a plurality of depressed panel sections 26 extending longitudinally thereof.

The top 8 of the structure comprises generally end frame members 30, side frame members 31 and intermediate longitudinally extending members 32, all comprised of C-channels secured together at their corners and their ends.

The spacing between the side channel members 31 and the intermediate channel members 32 is such that when the devices are stacked one upon another, the panel portions 26 of the bottom plate 25 will nest snugly between the channels of the top, thus retaining the devices against side slip.

The ends 36 of the panels 26 terminate short of the lower channel members 11 of the end panels 5, as shown in Fig. 3, thus providing a stopping surface against the end movement of the stacked crates.

Strengthening bars 37, extending transversely of the top 8, pass through both flanges of each of the intermediate channel members 32, and through the inner flanges of the side frame members 31, with their ends abutting the inner faces of each of the outer flanges of the channel members 31. Spaced apart aluminum rods 38, smaller in diameter than the rods 37, are connected with the four top channel members in the same manner as the rods 37. In the space between the channels 31 and 32, defined by the rods 37, are a plurality of spaced apart short rods 39, which extend through the adjacent or facing flanges of the channels 31 and 32, with their ends abutting the opposite flanges.

An adjustable door 40, to be hereinafter described, is located within the space defined by the rods 37 and the channel members 32.

In asemblying the end and side panels 5 and 6, the tapered ends of the rods 12 are forced through aligned holes in the plates of the upper and lower channel members, and then upset or riveted, as shown in section in Fig. 8. Since the shoulders 13 of the rods 12 abut the flat surfaces of the channel plates as shown at 42, the rods are so firmly held in the channels that relative movement of the upper and lower channel members flexes the rods but does not loosen them.

In a like manner, the reduced ends 18 and 19 of each of the tubular members extend through the plates of the upper and lower channel members to an extent permitting the ends to be upset against the adjacent metal surfaces as shown, for example, in Figs. 6 and 11. The reduced portion 19 is long enough to extend through its corresponding channel and the metal of the bottom plate 25, and to be spun or pressed against the outside surface thereof, as more clearly shown in Fig. 11.

The end of each lower channel member 20 of the side panel 6 is provided in its plate portion 45 with a bifurcation 46. The inner flanges of the end channels 11 are milled away as at 51 to receive the bifurcated ends of the channels 20, as shown more clearly in Fig. 19.

Figure 19:
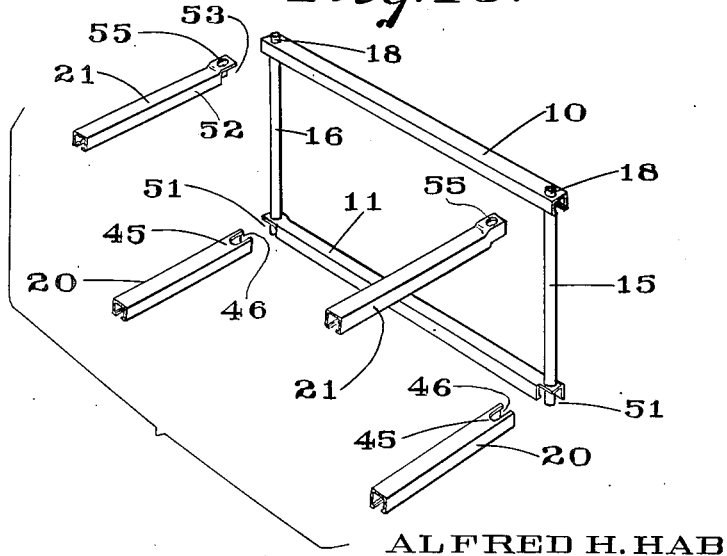
Fig. 19 is an exploded fragmentary view in perspective of one end of the body frame.

Also as shown in Fig. 19, the upper side channel members 21 of the side panels have their inner flanges 52 cut away, as at 53, for a distance equal to the width of an upper end channel member 10, and their plate portions adjacent the cutaway portions 53 are each bent upwardly and provided with a hole 55 adapted to register with the upper end 18 of the adjacent tubular member in assembling the device.

After the end and side panels 5 and 6 have been assembled as heretofore described, the next step in the assembly consists in lining the panels up in their relative positions and moving the end panels in a longitudinal direction with respect to the side panels until the bifurcated ends of the channels 20 slide into engagement with the lower ends of the tubular members 15 and 16, with the bifurcation entering the cutaway portions 51 on the inner flange of the end channels 11. At the same time that the bottom channel members are being moved into position, the upper side channel members will move into position to engage the cutaway portions 53, embracing the ends of the upper end channel members, to position the hole 55 in registry with the reduced upper end tubular members 15 and 16 with the bifurcation entering the cutaway portions 51 on the inner flange of the end channels 11. At the same time that the bottom channel members are being moved into position, the upper side channel members will move into position to engage the cutaway portions 53, embracing the ends of the upper end channel member, to position the hole 55 in registry with the reduced upper end portion 18 of its corresponding tubular member.

The bottom plate 25 is preformed with an upturned rim 60 extending around its periphery which is adapted to engage the outer faces of lower channel members with a forced fit. Adjacent its periphery, the plate 25 is provided through its lower surface with openings 61 to receive the reduced ends 19 of the tubular members which, when the bottom has been forced over the channels, are upset, as at 62, Fig. 6.

The top portion 8 is vertically adjustable with respect to the body portion 5. For this purpose, end rods 70, 71 and 72 are provided for sliding engagement within the tubular members 15, 16 and 17, respectively. Similarly, side rods 73 are adapted to slidably engage within the side tubular members 23.

Each of the end rods 70 and 71 located at the corners of the structure is provided with three reduced portions 75, two of which are shown in Fig. 8. These reduced portions are spaced longitudinally of the rods in position to cooperate with a locking mechanism to be hereinafter described to lock the top 8 in various positions of vertical adjustment.

The center rod 72 is milled or cut away to provide oppositely disposed flattened surfaces 85, Fig. 9, of which only one set is shown, but it will be understood that three sets are provided corresponding in spacing to the spacing of the notches or reduced portions 75 in the rods 70 and 71.

The tubular member 16 is provided with an arcuate slot 76, within the end channel member 10, to receive a plate 77, connected by a bar 78, with a second plate 79, located upon the opposite side of the rod 72 from the plate 77. The plate 79 is provided with angularly arranged edges 80 and 81. The edge 80 extends laterally of the channel 10 and the edge 81 longitudinally thereof. The plate 79 is provided with a right angled flange 82 to abut one end of a compression spring 83. The sloping edge 80 engages one of the flat portions 85 of the rod 72 and is adapted to be moved in a longitudinal direction by the rotation of the rod 72 to withdraw the end of the plate 77 from the notch or reduced portion 75 in the rod 71 to permit it to move longitudinally in its tubular member 16.

A substantial duplicate of the locking member above described but cooperating with the end rod 71 comprises the plate 77', bar 78', plate member 79' with the angularly arranged edges 80' and 81' and the flange member 82' located upon the end of the plate 77' to abut the opposite end of the compression spring 83. The sloping face 80' engages the opposite side of the flattened portion 85 from that engaged by the face 80 of member 79. Arcuate slots 90 and 91, through opposite sides of the tubular member 17, permit the edges of the plate members 79 aid 79' to pass into engagement with the opposite faces of the flattened portions 85 for actuation of the locking plates 77 and 77' by rotational movement of the rod 72.

The upper end of the rod 72 extends upwardly between the flanges of the end channel 30, and is provided with a reduced portion 95 with flattened sides to receive a lever 96 by means of which the rod 72 is rotated for operating the locking mechanism above described.

The lever 96 comprises a tapered flat portion 97, adapted to move in a slot 92, provided in the inside flange of the channel 30, and a downwardly extending flange 99, adapted to lie against the side flange of the channel 30. The larger end of the flat portion 97 is provided with an opening 100, adapted to fit over the reduced portion 95 of the rod 72. The upper end of the rod 72 abuts the lower face of the plate of channel member 30, and is provided in its end with an internal bottom tapped opening to receive a screw 101 which extends through an opening 102 in the plate of channel 30, with its head 103 spaced sufficiently from the upper face of the channel to permit free rotation of the rod 72 without end play.

When the lever 96 is at a right angle to the channel 30, the plates 77 and 77' will be in engagement with a corresponding locking notch 75 in the end rods 70 and 71 to retain the top section 8 against vertical movement. Turning the lever 96 through an angle of approximately ninety degrees in a clockwise direction, as viewed in Fig. 9, will move the flat faces 85 against the sloping faces 80 and 80' of the plates 79 and 79', thereby moving the bars 78 and 78' longitudinally against the compression spring 83 to withdraw the plates 77 and 77' from engagement with the reduced portions 75 of the rods 70 and 71. This permits these rods to move longitudinally within their tubular members 15 and 16. When the lever 96 has been swung into parallelism with the channel member 10, the flattened portions 85 of the rod 72 will clear the sloping faces 80 and 80' of the plates 79 and 79' to permit longitudinal movement of the rod 72. Release of pressure upon the lever 96 after the top 8 has been moved out of a locked position will cause the pressure of the spring 83 to move the locking plates into engagement with the reduced portions 75 on the rods 70 and 71 and flat faces 85 on the rod 72 when, in the vertical movement of the top 8, the reduced portions 75 and the flat faces 85 are brought into positions opposite the outer ends of the plates 77 and 77' and the plates 79 and 79', respectively.

Each end of the crate is equipped with the locking mechanism above described. To make the height adjustment between the top and body parts of the crate, the user will squeeze the two levers 96 simultaneously to release the locking plates, and will lift or press the top, depending upon the direction of adjustment required, and will release the lever 96 when the relative position of the two parts is approximately that desired. The return movement of the lever 96 to the locking position may be supplemented by a coiled restoring spring 104 surrounding the reduced portion 95 of the rod 72 between the upper face of the lever 96 and the lower face of the plate of the channel 30. Inturned flanges 84 and 84' on the channel 30 retain the plates 77 and 77', the plates 78 and 78' and the bars 79 and 79' against downward movement through the bottom of the channel.

Diagonally opposed ones of the side rods 73 are each provided adjacent the lower end with a cutaway flat faced portion 110 to which is secured the lower end of an outwardly tensioned flat spring 111, the upper end of which normally presses against the inner face of its tubular member 23 and is restrained thereby. Adjacent its upper end, the tubuluar member 23 is provided with a notch 112 opening through a portion of its periphery to receive the upper end of the spring member 111 when the rod 73 approaches withdrawal from its tube in the upward movement of the top 8. This prevents complete withdrawal of the top in case the locking mechanism is held in a releasing position when the top has been raised to its topmost position of adjustment. Complete removal of the top may be had by pressing the upper ends of the spring 111 against the flattened portion 110 to unlock the parts.

To prevent the crate from being collapsed in case the end locking mechanism becomes disengaged when the device is in either its intermediate or top position of adjustment, channel shaped side latches 115 are provided for the intermediate position and 116 for the uppermost position. Two of each are provided for each side of the crate, and they are pivotally supported upon the side channel members 21, one upon each side of each rod 73. When the top member 8 is moved into one of its upper positions, the four side latches corresponding to that position will be swung into a vertical position to engage the channel members 21.

The door 40, hereinbefore referred to, comprises an aluminum sheet stamped and formed with a plurality of parallel ribs 120 with downwardly extending flanges 121 terminating in U-shaped end plates 122 having sliding engagement with the lower edges of channel members 32. A retaining plate 123 (Fig. 13), provided with ears 124, is secured by rivets 125 to the upper face of each of the end plates 122. The ears 124 engage the upper faces of inturned flanges 126 of the channel members 32 to support and guide the door 40 in sliding engagement with the channel members 32. The centrally located rib 120' of the door (Fig. 15) is of greater width than the remaining ones and supports a latch mechanism for the door. The latch mechanism comprises a channel shaped member 130, with depending flanges 131, and is located below the rib 120'. At their inner ends, the flanges 131 are each provided with an opening 132, adapted to receive a pivoting stud 133, which is extended through and is riveted at its opposite ends to flange portion 121' of the rib 120'. Intermediate its end, the member 130 is provided with an upwardly extending boss 134 which extends through an opening 135 in the member 120'.

A rectangular plate 136 is formed upon the outer end of the member 130 and extends vertically upward therefrom. This plate 136 is of a length equal to the space between three adjacent rods 39 and extends upwardly through a slot 140 in the end plate 122 and into the interior of the channel member 32. The end of the rod 39, which is in line with the central longitudinal axis of the rib 120', is terminated on the inside of the outer flange of the channel member 32 to permit vertical movement of the plate 136. The width of the plate 136 is such that its upper edge normally projects above the lower surfaces of the inner ends of the rods 39 upon each side of the central shortened rod 39.

A coiled spring 145, surrounding the pivoting member 133, has its inner end 146 in contact with the inside face of the member 120' and its outer end in contact with the under face of the member 130 to normally urge the member 130 in an upward direction. By pressing down on the boss 134, the plate 136 will be moved below the surfaces of the inner ends of the rods 39, and the door 40 will be free to slide along the channel members 32 in either direction to provide access to the interior of the crate. The plate 136 cannot move to its locking position except when the door is closed because in all other positions, it will be stopped by either one or two of the rods 39. By removing the pressure from the boss 134, the door will be automatically locked when slid back to position midway of the crate.

Although I have shown and described my invention with respect to certain details of construction, it is to be understood that I do not wish to be unduly limited thereto, certain modifications being possible without departing from the spirit or scope of my invention.

I claim:

1. In a crate for handling live poultry, a lower section comprising end and side panels each comprising upper and lower channel members connected by spaced apart vertically extending metal rods and tubes, a bottom closure for the lower section, a top closure for the lower section comprising a rectangular structure including a plurality of depending metal rods slidable in the tubes of the bottom section, and safety latching members adapted to retain separations between the upper and lower sections, said latching members comprising channeled triggers pivotally supported at one end upon the upper channel members of the side sections and adapted in their unoperated position to overlie a portion of the upper side channel members and in their operated positions to engage at their free ends with the top closure section.

2. In a crate for handling live poultry, end and side panels each comprising top and bottom lower channel members, the channel members of the side panels being bifurcated at their ends, and tubular members secured to the ends of the top and bottom channel members of the end panel to receive the bifurcated ends of the lower channel members of the side panels.

3. In a crate for the purpose described, a lower section comprising upper and lower frame members formed of metal channels, tubular members connected to the upper and lower frame members at the sides, ends and corners, a rectangular top for the crate, latching rods provided with longitudinally spaced notches secured to the corners of the top and slidable in the corner tubular members, rotatable rods provided with oppositely disposed flat faces secured to the top intermediate the corners and rotatable and slidable in tubular members intermediate the corner tubular members, and a pair of spring pressed latch members located within the upper channel of the lower section with their opposite ends normally in engagement with notches in the corner rods and flat faces of the rotatable rods respectively, and means to turn the rotatable rods to disengage the outer ends of the latch members from the corner rods.

4. In a crate for the purpose described, a lower section comprising upper and lower frame members formed of metal channels, tubular members connected to the upper and lower frame members at the sides, end and corners, a rectangular top for the crate, latching rods provided with longitudinally spaced notches secured to the corners of the top and slidable in the corner tubular members, rotatable rods provided with oppositely disposed flat faces secured to the top intermediate the corners and rotatable and slidable in tubular members intermediate the corner tubular members, and a pair of spring pressed latch members located within the upper channel of the lower section with their outer ends in engagement with notches in the corner rods and their inner ends extending past each other into engagement with flat faces on the sides of the rotatable rods opposite their outer ends, and means to turn the rotatable rods to move the latch members toward each other and out of engagement with the corner rods.

5. In a crate for the purpose described, a lower section comprising upper and lower frame members formed of metal channels, tubular members connected to the upper and lower frame members at the sides, ends and corners, a rectangular top for the crate, latching rods provided with longitudinally spaced notches secured to the corners of the top and slidable in the corner tubular members, rotatable rods provided with oppositely disposed flat faces secured to the top intermediate the corners and rotatable and slidable in tubular members intermediate the corner tubular members, a pair of longitudinally movable latch members provided with plate portions, a compression spring between the plate portions normally urging the latch members in opposite directions to engage their outer ends with locking surfaces in the corner rods, plates upon opposite ends of the latching members each engageable with a flat face of the rotatable member on the side opposite the outer end of the latch member, and means to turn the rotatable rod to move the outer ends of the latch members inwardly against the tension of the spring.

6. In an all metal crate for handling live poultry, a bottom section, a top section comprising a channel and rod frame assembly provided with a central opening for insertion and removal of poultry, spaced reinforcing C-shaped channel members extending longitudinally of the top intermediate the sides with their flanges extending downwardly and inwardly, a movable closure for the opening comprising a sheet aluminum stamping with curved stiffened ribs and formed ends to engage over the lower edges of the reinforcing channels, clips secured to the upper faces of the formed ends to engage over the inturned legs of the reinforcing channels, spaced rods extending transversely of the top between a reinforcing channel and a side channel of the top section, and a spring pressed latch secured to the closure for engagement between separated ones of the spaced rods.

7. In an all metal crate for handling live poultry, a bottom section, a top section comprising a channel and rod frame assembly provided with a central opening for insertion and removal of poultry, spaced reinforcing C-shaped channel members extending longitudinally of the top intermediate the sides with their flanges extending downwardly and inwardly, a movable closure for the opening comprising a sheet aluminum stamping with curved stiffened ribs and formed ends to engage over the lower edges of the reinforcing channels, clips secured to the upper faces of the formed ends to engage over the inturned legs of the reinforcing channels, spaced rods extending transversely of the top between a reinforcing channel and a side channel of the top section, a spring restored latch operating plate secured to the underside of a centrally located one of the curved stiffened ribs, a latch member on said plate for engagement between separated ones of the spaced rods, and a boss upon the operating plate extending upwardly through an opening in the rib.

8. In a crate for the purpose described, a lower section comprising upper and lower frame members, tubular members connected to the upper and lower frame members at the sides and ends, diagonally opposed ones of the side tubular members being provided adjacent their upper ends with latching openings, a rectangular top for the crate, depending rods secured to the top for sliding movement in the tubular members of the bottom, and a spring latch attached to the lower end of diagonally opposed rods, said latch being inoperative in the lowered position of the top and being engaged in the latching openings of the corresponding tubular members in a raised position of the top.

9. In a crate for handling live poultry, a lower section having end and side walls comprised of spaced apart metal rods and tubes and a bottom closure, a top closure comprising a rectangular structure including a plurality of depending metal rods slidable in the tubes of the lower section to permit separation between the lower section and the top closure, and swinging latch members carried by the lower section and engageable with the top closure to latch it in spaced relation with respect to the lower section.

ALFRED H. HABERSTUMP.

REFERENCES CITED

The following references are of record in the file of this patent:

UNITED STATES PATENTS

| Number | Name | Date |
| --- | --- | --- |
| 506,181 | Myers | Oct. 3, 1893 |
| 1,436,869 | Eggert et al. | Nov. 28, 1922 |
| 2,466,220 | Ferguson | Apr. 5, 1949 |